United States Patent
Spurr

(10) Patent No.: US 6,718,613 B2
(45) Date of Patent: Apr. 13, 2004

(54) METHOD OF ASSEMBLY OF FIRST AND SECOND COMPONENT

(75) Inventor: Nigel Spurr, Binningham (GB)

(73) Assignee: Meritor Light Vehicle Systems Limited (GB)

( * ) Notice: Subject to any disclaimer, the term of this patent is extended or adjusted under 35 U.S.C. 154(b) by 0 days.

(21) Appl. No.: 09/853,334

(22) Filed: May 11, 2001

(65) Prior Publication Data

US 2001/0054222 A1 Dec. 27, 2001

(30) Foreign Application Priority Data

May 13, 2000 (GB) .............................................. 0011460

(51) Int. Cl.$^7$ .......................... B21D 39/00; B23P 19/02; B23P 11/02

(52) U.S. Cl. .............................. 29/505; 29/525; 29/453

(58) Field of Search ......................... 29/505, 513, 520, 29/525, 409.5, 450, 453; 439/352, 350, 353, 357

(56) References Cited

U.S. PATENT DOCUMENTS

| 2,147,343 | A | | 2/1939 | Hokanson |
| 2,795,447 | A | * | 6/1957 | Sclage .................... 292/169.22 |
| 2,950,397 | A | | 8/1960 | Bedford, Jr. |
| 5,080,677 | A | | 1/1992 | Shelley |
| 6,045,388 | A | * | 4/2000 | Higgins et al. ............. 439/352 |

FOREIGN PATENT DOCUMENTS

| DE | 4426135 | 1/1996 |
| DE | 19717906 | 10/1998 |
| FR | 2773580 | 7/1999 |

* cited by examiner

Primary Examiner—John C. Hong
(74) Attorney, Agent, or Firm—Carlson, Gaskey & Olds

(57) ABSTRACT

A method of assembly of a first and second component comprising the steps of providing the first component with a projection providing a second component with a plastics engagement surface assembling the first and second components such that the projection is held substantially rigid relative to the first component and the plastics engagement surface is plastically deformed around the projection then allowing the plastics engagement surface to further creep around the projection such that the force required to disassemble the first and second components increases.

42 Claims, 2 Drawing Sheets

METHOD OF ASSEMBLY OF FIRST AND SECOND COMPONENT

This application claims priority to United Kingdom (GB) patent publication number 0011460.3 filed on May 13, 2000.

BACKGROUND OF THE INVENTION

The present invention relates to methods of assembling a first component and a second component, and in particular the method of assembling a latch housing onto a door latch mounting plate of a vehicle.

Various known methods of attaching two components together are by the use of separate fixings such as screws, nuts and bolts, separate clips and the like. Alternatively gluing can be used.

However, all these methods require components or material (glue) in addition to the first and second components to be connected together.

SUMMARY OF THE INVENTION

An object of the present invention is to provide a cheap method of connecting two components together.

Thus according to the present invention there is provided a method of assembly of a first and second component comprising the steps of providing the first component with a projection, providing the second component with a plastics engagement surface, assembling the first and second components such that the projection is held substantially rigid relative to the first component and the plastics engagement surface is plastically deformed around the projection then allowing the plastics engagement surface to further creep around the projection such that the force required to disassemble the first and second components increases.

According to a further aspect of the present invention there is provided a method of assembling a first and second component, the method comprising the steps of providing the first component with a projection and an associated abutment surface, providing the second component with a plastics engagement surface and an associated further abutment surface, assembling the first and second component such that the plastics engagement surface is plastically deformed around the projection, then maintaining the engagement between the plastics engagement surface and the projection by virtue of co-operation between the abutment surface and further abutment surface such that the plastics engagement surface can further creep around the projection such that the force required to disassemble the first and second components increases.

According to a further aspect of the present invention there is provided a method of assembling a first and second component comprising the steps of providing the first component with a planar portion having first and second faces defining a plane and an edge, profiling the edge to provide a projection in the plane, providing the second component with a plastics engagement surface, assembling the first and second components such that the plastics engagement surface is plastically deformed around the projection, then allowing the plastics engagement surface to further creep around the projection such that the force required to disassemble the first and second components increases.

BRIEF DESCRIPTION OF THE DRAWINGS

The invention will now be described, by way of example only, with reference to the accompanying drawings in which.

DETAILED DESCRIPTION OF THE PREFERRED EMBODIMENT

Figure 1:
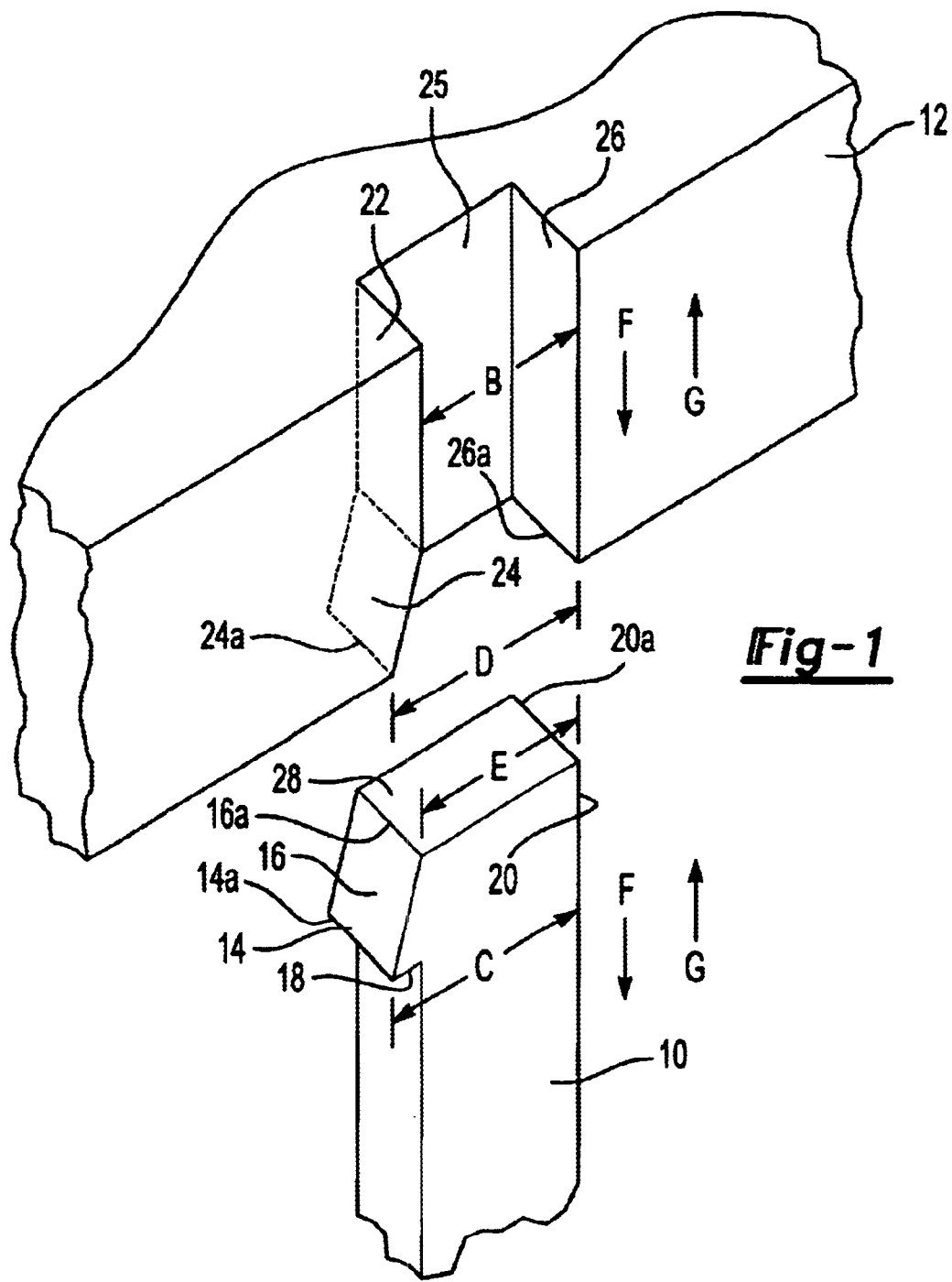
FIG. 1 is an isometric view of a first and second component to be connected together according to the present invention.

With reference to FIG. 1 there is shown a first component 10 and a second component 12. First component 10 is made of a rigid material, in this case steel, and includes a projection 14 in the form of a barb having a ramp surface 16 and a retention surface 18. First component 10 further includes an abutment surface 20.

It should be noted that the barb 14 and abutment surface 20 face in opposite directions.

Second component 12 is made of a plastics material and includes a plastics engagement surface 22 having a ramp portion 24. The second component 12 further includes a further abutment surface 26.

It should be noted that further abutment surfaces 26 faces plastics engagement surface 22 and ramp portion 24 and defines a recess 25.

The components are assembled together by moving the first and second components in the direction of arrows F relative to each other.

It should be noted that the distance E between the upper edge 20A of abutment surface 20 and the upper edge 16A of ramp surface 16 is less than the distance D between the lower edge 26A of further abutment surface 26 and the lower edge 24A of ramp portion 24. Thus initial entry of the first component 10 into the recess 25 is not restricted and furthermore is guided by ramp surface 16 in engagement with ramp portion 24.

It should be noted that the distance B between the plastics engagement surface 22 and the further abutment surface 26, is less than the distance C between the abutment surface 20 and barb edge 14A. Thus progressive engagement between the first and second components causes the plastics engagement surface to plastically deform around the relatively rigid barb 14 since the distances B and C provide for an interference fit between the first and second components.

Once the first and second components are fully engaged, in this case wherein top surface 28 of the first component lies flush with surface 30 of the second component, the assembly is left to stand for a predetermined time, typically 24 hours. During this predetermined time period the plastics material of the plastics engagement surface in the vicinity of the barb edge 14A is under a stressed condition and tends to relax and creep away from barb edge 14A. Some material will creep along the ramp surface 16 and other material will creep behind the retention surface 18. In particular that material that creeps behind the retention surface 18 tends to increase the force required to disengage components in the direction of arrows G.

Figure 2:
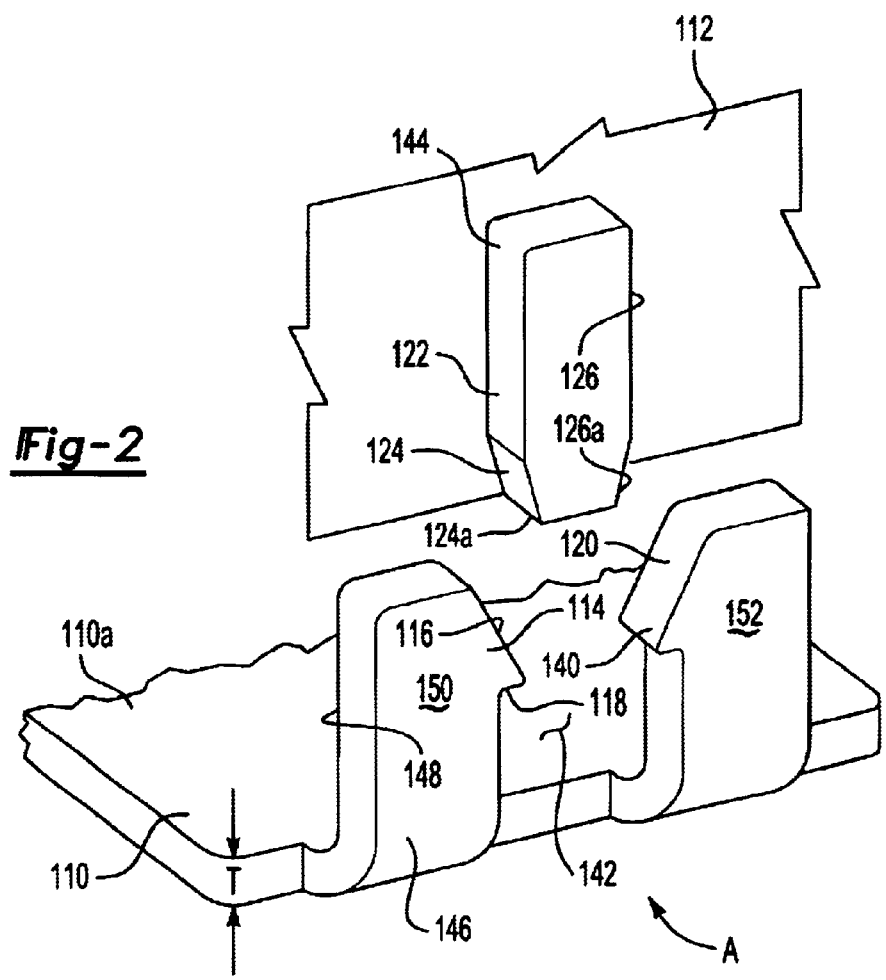
FIG. 2 is an isometric view of a second embodiment of a first and second component to be connected together according to the present invention.
Figure 3:
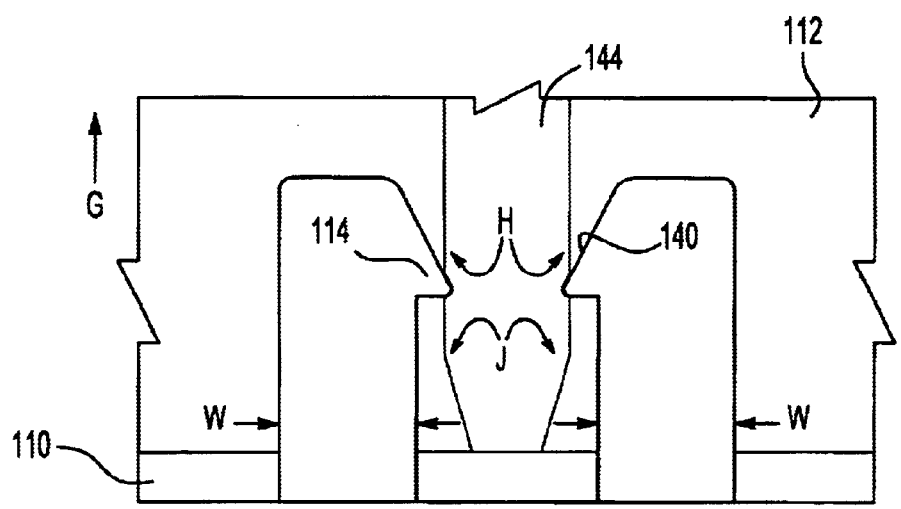
FIG. 3 is a view taken in the direction of arrow A of the first and second component of FIG. 2 in an assembled condition.

With reference to FIGS. 2 and 3 there is shown further first and second components 110 and 112, having features labeled 100 greater than those features which perform the same function on first and second components 10 and 12.

In this case the abutment surface 120 is in the form of a barb 140 which faces barb 114. Barbs 140 and 114 define a recess 142.

Furthermore the second component includes a boss 144 which includes a plastics engagement surface 122 which faces away from the further abutment surface 126 also included on the boss 144.

In this case the first component 110 is a steel mounting plate of a door latch and the second component 112 is a plastics housing of a door latch.

First component 110 is made from sheet metal having a first surface 146 and a second surface 148. In this case tabs 150 and 152 are bent upwardly and the edges of tabs 150 and 152 provide for barbs 114 and 140. In particular it can be seen that barb 114 lies in the plane defined by tab 150 and barb 140 lies in the plane defined by tab 152. Furthermore the planes defined by tabs and 150 and 152 are coincident.

During assembly of the first and second components, the boss 144 applies a separating force to the tabs 150 and 152. However, the tabs remain substantially fixed relative to the main body portion 110A of component 110 by virtue of the thickness T of the sheet metal material and by virtue of the width W of the tabs. Thus tabs 150 and 152 are substantially rigid and substantially do not act in a resilient manner. In particular by providing the barbs in the plane of the tabs this provides for a particular rigid arrangement.

Consideration of FIG. 3 shows the first component 110 and the second component 112 in a fully assembled condition and progressively, over time, plastics material proximal barbs 114 and 140 creeps in the direction of arrows H along the ramp surfaces of barbs 114 and 140, and also creeps in the direction of arrows J behind the retention surfaces of barbs 114 and 140.

It can be seen that it is that material that creeps in the direction of arrows J that effectively increases the interference fit between the first and second components and therefore increases the force required to separate the components in the direction of arrows G.

The applicant is the first to realize that this progressive creeping with time of the plastics material can be utilized to increase a retention force of two components. Thus by providing a suitable time period wherein this creep can take place, when the two components are subsequently used and subjected to pull away forces, the components will remain attached when subject to higher pull away forces.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of assembly of a latch housing to a door latch mounting plate comprising the steps of:

providing the door latch mounting plate with a projection, providing the latch housing with a plastics engagement surface, assembling the latch housing to the door latch mounting plate such that the projection is held substantially rigid relative to the door latch mounting plate and the plastics engagement surface is plastically deformed around the projection then allowing the plastics engagement surface to further creep around the projection such that the force required to disassemble the latch housing from the door latch mounting plate increases.

2. A method as defined in claim 1 in which the projection is held substantially rigid relative to the door latch mounting plate by the strength of the door latch mounting plate and said projection.

3. A method as defined in claim 1 in which the projection is held substantially rigid relative to the door latch mounting plate by an abutment surface associated with the projection co-operating with a further abutment surface associated with the plastics engagement surface.

4. A method as defined in claim 1 in which the projection is a barb having a ramp surface and a retention surface.

5. A method as defined in claim 3 in which the abutment surface faces towards the projection.

6. A method as defined in claim 3 in which the abutment surface faces away from the projection.

7. A method as defined in claim 3 in which the further abutment surface faces towards the plastics engagement surface.

8. A method as defined in claim 3 in which the further abutment surface faces away from the plastics engagement surface.

9. A method as defined in claim 3 in which the further abutment surface includes a further projection.

10. A method as defined in claim 9 in which the further projection is a barb having a ramp surface and a retention surface.

11. A method as defined in claim 1 further including the step of using the assembled latch housing and door latch mounting plate with an applied disengagement force.

12. A method as defined in claim 1, in which the door latch mounting plate is made from sheet metal.

13. A method as defined in claim 12, in which the projection is formed on a tab which is bent from a general plane of the door latch mounting plate.

14. A method as defined in claim 13 in which the tab defines a tab plane and the projection is in the tab plane.

15. A method of assembling a latch housing to a door latch mounting plate, the method comprising the steps of providing the door latch mounting plate with a projection and an associated abutment surface, providing the latch housing with a plastics engagement surface and an associated further abutment surface, assembling the latch housing to the door latch mounting plate such that the plastics engagement surface is plastically deformed around the projection, then maintaining the engagement between the plastics engagement surface and the projection by virtue of co-operation between the abutment surface and further abutment surface such that the plastics engagement surface can further creep around the projection such that the force required to disassemble the latch housing from the door latch mounting plate increases.

16. A method as defined in claim 15 in which the abutment surface and further abutment surface act during assembly to provide an engagement force between the projection and the plastics engagement surface.

17. A method as defined in claim 15 in which the projection is a barb having a ramp surface and a retention surface.

18. A method as defined in claim 17 in which the barb is relatively sharp.

19. A method as defined in claim 15 in which the abutment surface faces towards the projection.

20. A method as defined in claim 15 in which the abutment surface faces away from the projection.

21. A method as defined in claim 15 in which the further abutment surface faces towards the plastics engagement surface.

22. A method as defined in claim 15 in which the further abutment surface faces away from the plastics engagement surface.

23. A method as defined in claim 15 in which the further abutment surface includes a further projection.

24. A method as defined in claim 23 in which the further projection is a barb having a ramp surface and a retention surface.

25. A method as defined in claim 15 further including the step of using the assembled latch housing and latch housing mounting plate under an applied disengagement force.

26. A method as defined in claim 15 in which the door latch mounting plate is made from sheet metal.

27. A method as defined in claim 26, in which the projection is formed on a tab which is bent from a general plane of the door latch mounting plate.

28. A method as defined in claim 27, in which the tab defines a tab plane and the projection is in the tab plane.

29. A method of assembling a latch housing to a door latch mounting plate comprising the steps of;
    providing the door latch mounting plate with a planar portion having first and second faces defining a plane and an edge, profiling the edge to provide a projection in the plane, providing the latch housing with a plastics engagement surface,
    assembling the latch housing and the door latch mounting plate such that the plastics engagement surface is plastically deformed around the projection, then allowing the plastics engagement surface to further creep around the projection such that the force required to disassemble the latch housing from the door latch mounting plate increases.

30. A method as defined in claim 29 further including step of providing an abutment surface associated with the projection and providing a further abutment surface associated with the plastics engagement surface which acts to maintain the engagement between the plastics engagement surface and the projection.

31. A method as defined in claim 30 further including the step of profiling an edge of the planar portion to provide the further abutment.

32. A method as defined in claim 29 in which the projection is a barb having a ramp surface and a retention surface.

33. A method as defined in claim 30 in which the abutment surface faces towards the projection.

34. A method as defined in claim 30 in which the abutment surface faces away from the projection.

35. A method as defined in claim 30 in which the further abutment surface faces towards the plastics engagement surface.

36. A method as defined in claim 30 in which the further abutment surface faces away from the plastics engagement surface.

37. A method as defined in claim 30 in which the further abutment surface includes a further projection.

38. A method as defined in claim 37 in which the further projection is a barb having a ramp surface and a retention surface.

39. A method as defined in claim 29 further including the step of using the latch housing and door latch mounting plate under an applied disengagement force.

40. A method as defined in claim 29, in which the door latch mounting plate is made from sheet metal.

41. A method as defined in claim 40 in which the projection is formed on a tab which is bent from a general plane of the door latch mounting plate.

42. A method as defined in claim 41 in which the tab defines a tab plane and the projection is in the tab plane.

* * * * *

UNITED STATES PATENT AND TRADEMARK OFFICE
CERTIFICATE OF CORRECTION

PATENT NO. : 6,718,613 B2
DATED : April 13, 2004
INVENTOR(S) : Spurr

It is certified that error appears in the above-identified patent and that said Letters Patent is hereby corrected as shown below:

Title page,
Item [75], Inventors, the residence should be -- Birmingham (GB) --
Item [73], Assignee, should read as -- Meritor Light Vehicle Systems (UK) Limited (GB) --

Signed and Sealed this

Sixth Day of July, 2004

JON W. DUDAS
*Acting Director of the United States Patent and Trademark Office*